(12) United States Patent
Nagashima

(10) Patent No.: US 10,082,180 B2
(45) Date of Patent: Sep. 25, 2018

(54) THRUST SLIDING BEARING

(71) Applicant: OILES CORPORATION, Tokyo (JP)

(72) Inventor: Tsuyoshi Nagashima, Fujisawa (JP)

(73) Assignee: OILES CORPORATION, Tokyo (JP)

( * ) Notice: Subject to any disclaimer, the term of this patent is extended or adjusted under 35 U.S.C. 154(b) by 0 days.

(21) Appl. No.: 15/500,656

(22) PCT Filed: Jul. 24, 2015

(86) PCT No.: PCT/JP2015/071139
§ 371 (c)(1),
(2) Date: Jan. 31, 2017

(87) PCT Pub. No.: WO2016/024472
PCT Pub. Date: Feb. 18, 2016

(65) Prior Publication Data
US 2017/0217274 A1    Aug. 3, 2017

(30) Foreign Application Priority Data

Aug. 12, 2014  (JP) ................................ 2014-164525

(51) Int. Cl.
*F16C 35/02* (2006.01)
*F16C 17/04* (2006.01)
(Continued)

(52) U.S. Cl.
CPC .............. *F16C 35/02* (2013.01); *B60G 15/06* (2013.01); *B60G 15/067* (2013.01); *F16C 17/04* (2013.01);
(Continued)

(58) Field of Classification Search
CPC .......... F16C 17/04; F16C 33/20; F16C 35/02; F16C 2326/05; B60G 2204/418
See application file for complete search history.

(56) References Cited

U.S. PATENT DOCUMENTS 8,596,661 B2 * 12/2013 Kaneko ................ B60G 15/068
                                                            280/124.155
9,334,897 B2 *  5/2016 Nagashima ............. F16C 33/74
(Continued)

FOREIGN PATENT DOCUMENTS

EP        2 602 500 A1    6/2013
JP      2008-014463 A     1/2008
(Continued)

OTHER PUBLICATIONS

Extended European Search report dated Apr. 10, 2018 in the corresponding European Patent Application No. 15 831 453.4.

*Primary Examiner* — James Pilkington
(74) *Attorney, Agent, or Firm* — Posz Law Group, PLC

(57) ABSTRACT

A thrust sliding bearing reduces the number of components to thereby reduce the burden of assembly and components management and prevents unusual wear of a surface of an annular synthetic resin-made sliding bearing piece, which faces an annular metal plate. A thrust sliding bearing comprises an upper case which is integrally formed at least by an annular upper case base having an annular bottom surface and by an upper case cylindrical portion which is provided vertically from the annular bottom surface of the upper case base to be fitted in a lower case, wherein a synthetic resin-made sliding bearing piece is fixed to the inner side of the upper case cylindrical portion.

9 Claims, 8 Drawing Sheets

(51) Int. Cl.
    *F16C 33/20*     (2006.01)
    *B60G 15/06*     (2006.01)
    *F16F 9/54*     (2006.01)
    *F16C 33/10*     (2006.01)

(52) U.S. Cl.
    CPC ............ *F16C 17/045* (2013.01); *F16C 33/20* (2013.01); *F16F 9/54* (2013.01); *B60G 2204/128* (2013.01); *B60G 2204/418* (2013.01); *F16C 33/102* (2013.01); *F16C 2326/05* (2013.01)

(56) References Cited

U.S. PATENT DOCUMENTS

| | | |
|---|---|---|
| 2010/0008610 A1 | 1/2010 | Kaneko et al. |
| 2013/0009376 A1 | 1/2013 | Kaneko et al. |
| 2013/0142462 A1 | 6/2013 | Morishige et al. |
| 2014/0185971 A1* | 7/2014 | Nagashima .......... B60G 15/068 384/291 |
| 2014/0355916 A1 | 12/2014 | Morishige et al. |
| 2015/0003761 A1 | 1/2015 | Nagashima et al. |

FOREIGN PATENT DOCUMENTS

| | | |
|---|---|---|
| JP | 2008-202703 A | 9/2008 |
| JP | 2011-196406 A | 10/2011 |
| JP | 2013-177933 A | 9/2013 |

\* cited by examiner

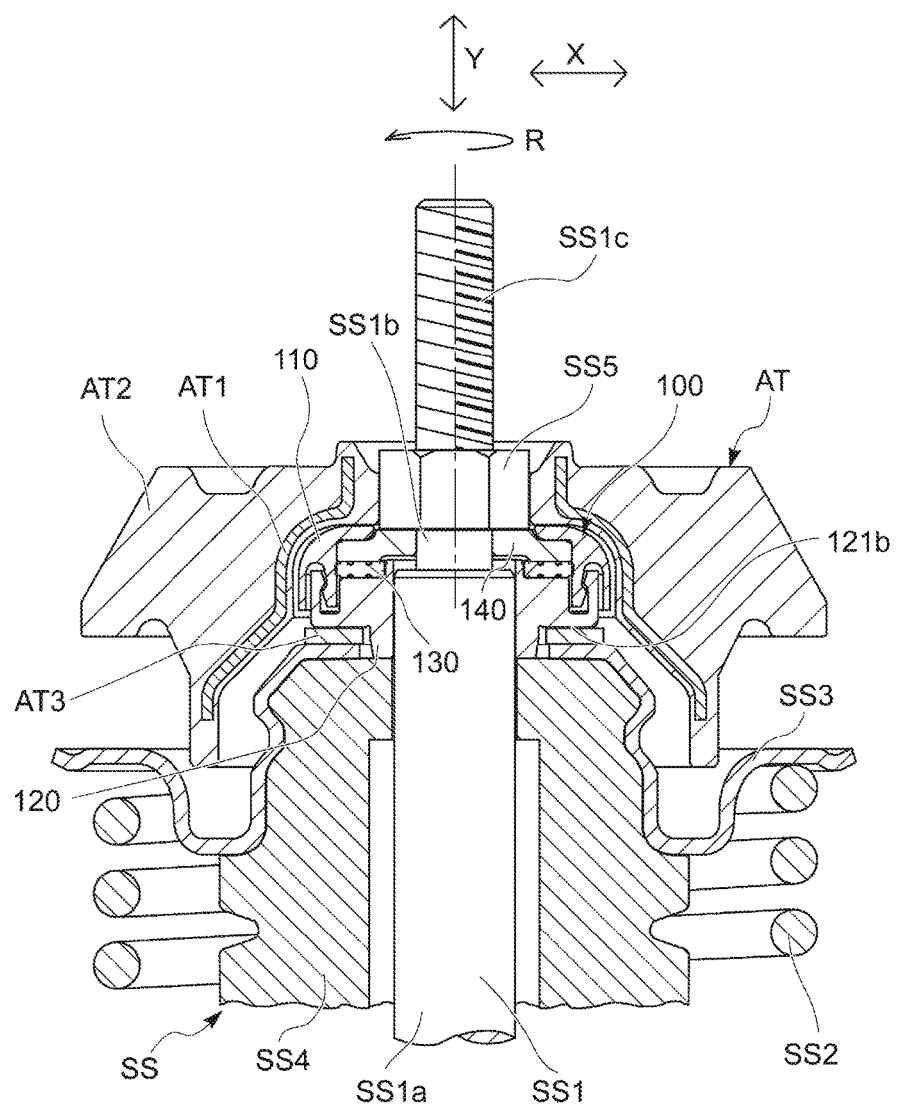

THRUST SLIDING BEARING

CROSS REFERENCE TO RELATED APPLICATIONS

This application is a U.S. national stage application of PCT/JP2015/071139 filed on Jul. 24, 2015, which claims priority to Japanese Patent Application No. 2014-164525 filed on Aug. 12, 2014, the contents of which are incorporated herein by reference.

TECHNICAL FIELD

The present invention relates to a thrust sliding bearing including an upper case and a lower case that are slidable and rotatable relative to each other, and more particularly to a thrust sliding bearing incorporated into a four-wheeled vehicle of a strut-type (McPherson) suspension.

BACKGROUND ART

A strut-type suspension used for a four-wheeled vehicle generally includes a strut assembly combined with a damper coil spring. The strut assembly has an external cylinder which is integrated with a main shaft and in which a hydraulic shock absorber is incorporated.

Strut-type suspensions are classified based on whether a piston rod of the strut assembly rotates or not when the strut assembly rotates with the damper coil spring in accordance with steering operation. In either case, in order to allow smooth rotation of the strut assembly, instead of a rolling bearing, a synthetic resin-made thrust sliding bearing may be used between an attachment mechanism for attaching the strut assembly to a vehicle body and an upper end portion of the damper coil spring.

Conventionally, there is a known thrust sliding bearing including: a synthetic resin-made first bearing body placed at the lower side in an axial direction of a piston rod used for a strut-type suspension in a four-wheeled vehicle, and having an annular upper surface and an annular engaging outer peripheral surface; a synthetic resin-made second bearing body superposed on the first bearing body so as to be relatively rotatable about an axis of the first bearing body and having an annular lower surface; a thrust sliding bearing piece interposed between the annular upper surface of the first bearing body and the annular lower surface of the second bearing body and having an annular lower surface which is in a slidable contact with the annular upper surface of the first bearing body and an annular upper surface which is in slidable contact with the annular lower surface of the second bearing body; an annular upper cover having an annular engaging inner peripheral surface engaging the annular engaging outer peripheral surface of the first bearing body, the annular upper cover covering the second bearing body from the upper side in the axial direction; and an annular metal plate interposed between an annular upper surface of the second bearing body and a lower surface of the annular upper cover to be attached to the piston rod (for example, Patent Literature 1).

CITATION LIST

Patent Literature

Patent Literature 1: JP 5029058B (in particular, see FIG. 1 and FIG. 7)

SUMMARY OF INVENTION

Technical Problem

However, the foregoing conventional thrust sliding bearing has a complex structure formed of five components of the first bearing body, the second bearing body, the thrust sliding bearing piece, the annular upper cover, and the annular metal plate; therefore, a large work burden may be required for assembling these components and managing the components.

Here, if the second bearing body is integrated with the annular upper cover to allow the annular metal plate to make contact with the thrust sliding bearing piece, the number of components may be reduced. However, since the annular metal plate is configured so as to make contact with the thrust sliding bearing piece, the surface of the thrust sliding bearing piece, which faces the annular metal plate may be unusually worn when the thrust sliding bearing piece slides relative to the annular metal plate.

It is thus an object of the present invention, which has been achieved for addressing the aforementioned problems of the prior art, to provide a thrust sliding bearing that can reduce the number of components to decrease the burden of assembly and components management and that can prevent unusual wear of a surface of a synthetic resin-made sliding bearing piece, which faces an annular metal plate.

Solution to Problem

In order to address the above-described problems, a first aspect of the present invention provides a thrust sliding bearing includes: an annular upper case attached to an upper end portion of a piston rod with the piston rod inserted in the upper case, the piston rod being used in a shock absorber of a strut-type suspension; an annular lower case overlapped with the upper case to be rotatable relative to the upper case about an axial center of the piston rod; an annular synthetic resin-made sliding bearing piece provided in an annular space formed by the upper case and the lower case for receiving a thrust load of the piston rod; and an annular metal plate firmly attached to the piston rod and interposed between the upper case and the synthetic resin-made sliding bearing piece, wherein the upper case is integrally configured by an annular upper case base which has an annular bottom surface and by an upper case cylindrical portion which is provided to extend vertically from the annular bottom surface of the upper case base to be fitted in the lower case, and wherein the synthetic resin-made sliding bearing piece is fixed to the inner side of the upper case cylindrical portion of the upper case.

A second aspect of the present invention further addresses the above-described problems by providing the thrust sliding bearing according to the first aspect of the present invention, wherein the synthetic resin-made sliding bearing piece includes at least one anti-rotation engaging convex portion projecting radially outward from an outer circumferential rim of the synthetic resin-made sliding bearing piece and/or wherein the upper case includes at least one anti-rotation engaging convex portion projecting radially inward from an inner circumferential surface of the upper case cylindrical portion of the upper case, whereby the synthetic resin-made sliding bearing piece is pressed into the inner side of the upper case cylindrical portion of the upper case.

A third aspect of the present invention further addresses the above-described problems by providing the thrust sliding bearing according to the second aspect of the present invention, wherein the upper case cylindrical portion of the upper case includes an anti-rotation engaging groove which is provided to extend in an axial direction in the inner circumferential surface facing the synthetic resin-made sliding bearing piece, and wherein the anti-rotation engaging convex portion of the synthetic resin-made sliding bearing piece is provided engagable with the anti-rotation engaging groove.

A fourth aspect of the present invention further addresses the above-described problems by providing the thrust sliding bearing according to the third aspect of the present invention, wherein an imaginary maximum outer diameter of the synthetic resin-made sliding bearing piece including the anti-rotation engaging convex portion of the synthetic resin-made sliding bearing piece is larger than an imaginary maximum inner diameter of the inner circumferential surface of the upper case cylindrical portion of the upper case, not including the anti-rotation engaging groove.

A fifth aspect of the present invention further addresses the above-described problems by providing the thrust sliding bearing according to the third or fourth aspect of the present invention, wherein the anti-rotation engaging groove includes a plurality of anti-rotation engaging grooves which are arranged at equal intervals in a circumferential direction of the piston rod, wherein the anti-rotation engaging convex portion of the synthetic resin-made sliding bearing piece includes a plurality of anti-rotation engaging convex portions which are arranged at equal intervals in the circumferential direction, and wherein a relation between the number of anti-rotation engaging grooves and the number of anti-rotation engaging convex portions of the synthetic resin-made sliding bearing piece is defined to have a common divisor.

A sixth aspect of the present invention further addresses the above-described problems by providing the thrust sliding bearing according to the fifth aspect of the present invention, wherein the greatest common divisor between the number of anti-rotation engaging grooves and the number of anti-rotation engaging convex portions of the synthetic resin-made sliding bearing piece is defined as 3 or greater.

A seventh aspect of the present invention further addresses the above-described problems by providing the thrust sliding bearing according to any one of the second to sixth aspects of the present invention, wherein the lower case is integrally configured at least by an annular lower case base which has an annular top surface facing the annular bottom surface of the upper case and by an outer cylindrical projecting portion which projects from an outer circumferential end of an annular bottom surface of the lower case base toward the upper case base, wherein an annular groove located radially outward from the annular top surface of the lower case base is formed by the annular top surface of the lower case base, the lower case base, and the outer cylindrical projecting portion, wherein the upper case cylindrical portion of the upper case is inserted in the annular groove of the lower case, and an annular engaging ridge circumferentially formed on an annular engaging inner circumferential surface as an inner circumferential surface of the outer cylindrical projecting portion of the lower case is engaged with an annular engaging ridge circumferentially formed on an annular engaging outer circumferential surface as an outer circumferential surface of the upper case cylindrical portion of the upper case, and wherein an outer circumferential rim stepped portion is formed in a bottom surface of the synthetic resin-made sliding bearing piece to extend along the outer circumferential rim on the bottom surface and to be recessed upward in an axial direction, the outer circumferential rim stepped portion facing an outer circumferential rim on the annular top surface of the lower case base.

An eighth aspect of the present invention further addresses the above-described problems by providing the thrust sliding bearing according to any one of the second to seventh aspects of the present invention, wherein the annular metal plate includes an annular stepped portion via which the annular metal plate is divided into a portion at the radially outward side and a portion at the radially inward side, and a metal plate outward bottom surface of a metal plate outward portion located radially outward from the annular stepped portion is provided in contact with a top surface of the synthetic resin-made sliding bearing piece so as to face the top surface, and wherein a metal plate inward portion located radially inward from the annular stepped portion is engaged with a metal plate engaging hole formed in the upper case.

A ninth aspect of the present invention further addresses the above-described problems by providing the thrust sliding bearing according to any one of the second to eighth aspects of the present invention, wherein the anti-rotation engaging convex portion of the synthetic resin-made sliding bearing piece includes tapered surfaces arranged respectively at the upper and lower sides in the axial direction so as to be inclined with respect to the axial direction.

Advantageous Effects of Invention

The thrust sliding bearing of the present invention includes:
an annular upper case attached to an upper end portion of a piston rod with the piston rod inserted in the upper case, the piston rod being used in a shock absorber of a strut-type suspension; an annular lower case overlapped with the upper case to be rotatable relative to the upper case about an axial center of the piston rod; an annular synthetic resin-made sliding bearing piece provided in an annular space formed between the upper case and the lower case for receiving a thrust load of the piston rod; and an annular metal plate firmly attached to the piston rod and interposed between the upper case and the synthetic resin-made sliding bearing piece. With this configuration, not only can a smooth relative rotation between the upper case and the lower case be realized, but also the following specific effects can be achieved.

According to the thrust sliding bearing of the first aspect of the present invention, the upper case is integrally configured by an annular upper case base which has an annular bottom surface and by an upper case cylindrical portion which is provided to extend vertically from the annular bottom surface of the upper case base to be fitted in the lower case, and the synthetic resin-made sliding bearing piece is fixed to the inner side of the upper case cylindrical portion of the upper case. With this configuration, a friction force is generated between an outer circumferential rim of the synthetic resin-made sliding bearing piece and an inner circumference of the upper case cylindrical portion of the upper case; thereby, the friction force between the synthetic resin-made sliding bearing piece and the upper case becomes larger than a friction force between the synthetic resin-made sliding bearing piece and the lower case. Consequently, a holding force by which the synthetic resin-made sliding bearing piece is held toward the upper case acts; thereby, the synthetic resin-made sliding bearing piece is fixed to the upper case. As a result, sliding between the synthetic resin-made sliding bearing piece and the annular metal plate is suppressed and thus a surface of the synthetic resin-made sliding bearing piece, which faces the annular metal plate, can be prevented from being unusually worn.

According to the thrust sliding bearing of the second aspect of the present invention, in addition to the effect achieved by the invention according to the first aspect, the synthetic resin-made sliding bearing piece includes at least one anti-rotation engaging convex portion projecting radially outward from the outer circumferential rim of the synthetic resin-made sliding bearing piece and/or the upper case includes at least one anti-rotation engaging convex portion projecting radially inward from an inner circumferential surface of the upper case cylindrical portion of the upper case; thereby, the synthetic resin-made sliding bearing piece is pressed into the inner side of the upper case cylindrical portion of the upper case. With this configuration, the friction force between the synthetic resin-made sliding bearing piece and the upper case is increased. Consequently, sliding between the synthetic resin-made sliding bearing piece and the annular metal plate can be easily suppressed.

According to the thrust sliding bearing of the third aspect of the present invention, in addition to the effect achieved by the invention according to the second aspect, the upper case cylindrical portion of the upper case includes an anti-rotation engaging groove which is provided to extend in an axial direction in the inner circumferential surface facing the synthetic resin-made sliding bearing piece, and the anti-rotation engaging convex portion of the synthetic resin-made sliding bearing piece is provided engagable with the anti-rotation engaging groove. With this configuration, even if the synthetic resin-made sliding bearing piece is rotated relative to the upper case, the anti-rotation engaging convex portion of the synthetic resin-made sliding bearing piece is brought into engagement with the anti-rotation engaging groove; thereby, the rotation of the synthetic resin-made sliding bearing piece relative to the upper case is regulated within an angle smaller than 360 degrees and the synthetic resin-made sliding bearing piece is held. Consequently, subsequent sliding between the synthetic resin-made sliding bearing piece and the annular metal plate can be prevented.

According to the thrust sliding bearing of the fourth aspect of the present invention, in addition to the effect achieved by the invention according to the third aspect, an imaginary maximum outer diameter of the synthetic resin-made sliding bearing piece including the anti-rotation engaging convex portion of the synthetic resin-made sliding bearing piece is larger than an imaginary maximum inner diameter of the inner circumferential surface of the upper case cylindrical portion of the upper case, not including the anti-rotation engaging groove. With this configuration, the synthetic resin-made sliding bearing piece is brought into a state of being pressed into the inner side of the upper case cylindrical portion of the upper case. Consequently, a friction force can be easily generated between the outer circumferential rim of the synthetic resin-made sliding bearing piece and the anti-rotation engaging convex portion of the synthetic resin-made sliding bearing piece and the inner circumference of the upper case cylindrical portion of the upper case.

According to the thrust sliding bearing of the fifth aspect of the present invention, in addition to the effect achieved by the invention according to the third or fourth aspect, the anti-rotation engaging groove includes a plurality of anti-rotation engaging grooves which are arranged at equal intervals in a circumferential direction of the piston rod, the anti-rotation engaging convex portion of the synthetic resin-made sliding bearing piece includes a plurality of anti-rotation engaging convex portions which are arranged at equal intervals in the circumferential direction, and a relation between the number of anti-rotation engaging grooves and the number of anti-rotation engaging convex portions of the synthetic resin-made sliding bearing piece is defined to have a common divisor. Therefore, a part of the plurality of anti-rotation engaging convex portions of the synthetic resin-made sliding bearing piece are brought into engagement with a part of the anti-rotation engaging grooves until the synthetic resin-made sliding bearing piece is rotated relative to the upper case by an angle corresponding to the greatest common divisor between an angle with which the anti-rotation engaging grooves are arranged at equal intervals and an angle with which the anti-rotation engaging convex portions are arranged at equal intervals. Consequently, the rotation angle of the synthetic resin-made sliding bearing piece relative to the upper case can be reduced.

According to the thrust sliding bearing of the sixth aspect of the present invention, in addition to the effect achieved by the invention according to the fifth aspect, the greatest common divisor between the number of anti-rotation engaging grooves and the number of anti-rotation engaging convex portions of the synthetic resin-made sliding bearing piece is defined as 3 or greater. Therefore, there are provided three or more engagement portions between the anti-rotation engaging grooves and the anti-rotation engaging convex portions of the synthetic resin-made sliding bearing piece. Consequently, the center of the synthetic resin-made sliding bearing piece is aligned with the center of the upper case and thus eccentricity therebetween can be avoided.

According to the thrust sliding bearing of the seventh aspect of the present invention, in addition to the effect achieved by the invention according to any one of the second to sixth aspects, the lower case is integrally configured at least by an annular lower case base which has an annular top surface facing the annular bottom surface of the upper case and by an outer cylindrical projecting portion which projects from an outer circumferential end of an annular bottom surface of the lower case base toward the upper case base. An annular groove located radially outward from the annular top surface of the lower case base is formed by the annular top surface of the lower case base, the lower case base, and the outer cylindrical projecting portion. The upper case cylindrical portion of the upper case is inserted in the annular groove of the lower case, and an annular engaging ridge circumferentially formed on an annular engaging inner circumferential surface as an inner circumferential surface of the outer cylindrical projecting portion of the lower case is engaged with an annular engaging ridge circumferentially formed on an annular engaging outer circumferential surface as an outer circumferential surface of the upper case cylindrical portion of the upper case. An outer circumferential rim stepped portion is formed in a bottom surface of the synthetic resin-made sliding bearing piece to extend along the outer circumferential rim on the bottom surface and to be recessed upward in an axial direction, and the outer circumferential rim stepped portion faces an outer circumferential rim on the annular top surface of the lower case base. With this configuration, the synthetic resin-made sliding bearing piece is not in contact with the outer circumferential rim on the annular top surface of the lower case base. Therefore, even if the synthetic resin-made sliding bearing piece is deformed by an excess load, the relative rotation between the upper case and the lower case can be avoided from being hindered by a so-called wedge effect generated when the deformed portion of the synthetic resin-made sliding bearing piece is inserted into a clearance between the outer circumferential rim on the annular top surface of the lower case base and the inner circumferential surface of the upper case cylindrical portion of the upper case.

According to the thrust sliding bearing of the eighth aspect of the present invention, in addition to the effect achieved by the invention according to any one of the second to seventh aspects, the annular metal plate includes an annular stepped portion via which the annular metal plate is divided into a portion at the radially outward side and a portion at the radially inward side, and a metal plate outward bottom surface of a metal plate outward portion located radially outward from the annular stepped portion is provided in contact with a top surface of the synthetic resin-made sliding bearing piece so as to face the top surface. A metal plate inward portion located radially inward from the annular stepped portion is engaged with a metal plate engaging hole formed in the upper case. With the configuration described above, the metal plate outward bottom surface of the annular metal plate facing the top surface of the synthetic resin-made sliding bearing piece is provided in surface contact with the top surface; therefore, the annular metal plate can surely receive a thrust load from the synthetic resin-made sliding bearing piece.

Also, the position of the annular metal plate relative to the upper case in a radial direction is determined; therefore, the position of the thrust sliding bearing relative to the piston rod in the radial direction can be precisely determined.

Furthermore, the rigidity of the annular metal plate is increased; therefore, the annular metal plate can surely receive a load from the piston rod.

According to the thrust sliding bearing of the ninth aspect of the present invention, in addition to the effect achieved by the invention according to any one of the second to eighth aspects, the anti-rotation engaging convex portion of the synthetic resin-made sliding bearing piece includes tapered surfaces arranged respectively at the upper and lower sides in the axial direction so as to be inclined with respect to the axial direction. With this configuration, in an incorporating process for incorporating the synthetic resin-made sliding bearing piece into the inner side of the upper case cylindrical portion of the upper case, the tapered surfaces are brought into contact with the upper case cylindrical portion, thereby guiding the synthetic resin-made sliding bearing piece. Therefore, the synthetic resin-made sliding bearing piece can be smoothly pressed into the inner side of the upper case cylindrical portion of the upper case.

Also, the consideration of the top surface and the bottom surface of the synthetic resin-made sliding bearing piece is not necessary; therefore, a wrong assembly such as the assembly of the synthetic resin-made sliding bearing piece in a wrong direction can be avoided.

BRIEF DESCRIPTION OF DRAWINGS

FIG. 3 is a cross-sectional view illustrating a state where the thrust sliding bearing of the present invention is incorporated into a strut-type suspension.

DESCRIPTION OF EMBODIMENTS

Any specific embodiment of the present invention may be applicable, as long as the thrust sliding bearing of the present invention includes: an annular upper case attached to an upper end portion of a piston rod with the piston rod inserted in the upper case, the piston rod being used in a shock absorber of a strut-type suspension; an annular lower case overlapped with the upper case to be rotatable relative to the upper case about an axial center of the piston rod; an annular synthetic resin-made sliding bearing piece provided in an annular space formed between the upper case and the lower case for receiving a thrust load of the piston rod; and an annular metal plate firmly fixed to the piston rod and interposed between the upper case and the synthetic resin-made sliding bearing piece, wherein the upper case is integrally configured by an annular upper case base which has an annular bottom surface and by an upper case cylindrical portion which is provided to extend vertically from the annular bottom surface of the upper case base to be fitted in the lower case, and wherein the synthetic resin-made sliding bearing piece is fixed to the inner side of the upper case cylindrical portion of the upper case, whereby suppressing sliding between the synthetic resin-made sliding bearing piece and the annular metal plate to prevent unusual wear of a surface of the synthetic resin-made sliding bearing piece, which faces the annular metal plate.

For example, a means by which the sliding bearing piece can be fixed to the upper case may be any one of the following: press fitting, screw tightening, pinning, or gluing.

Also, the synthetic resin-made sliding bearing piece may be formed into, for example, an L-shape in a cross-sectional view to allow portions radially arranged to smoothly slide against each other, as long as the synthetic resin-made sliding bearing piece is arranged at least between the annular bottom surface of the upper case and an annular top surface of the lower case to allow members arranged in a thrust direction to smoothly slide against each other.

Embodiment

Hereinafter, a thrust sliding bearing 100 of an embodiment of the present invention will be described in accordance with FIG. 1 to FIG. 7.

Figure 1:
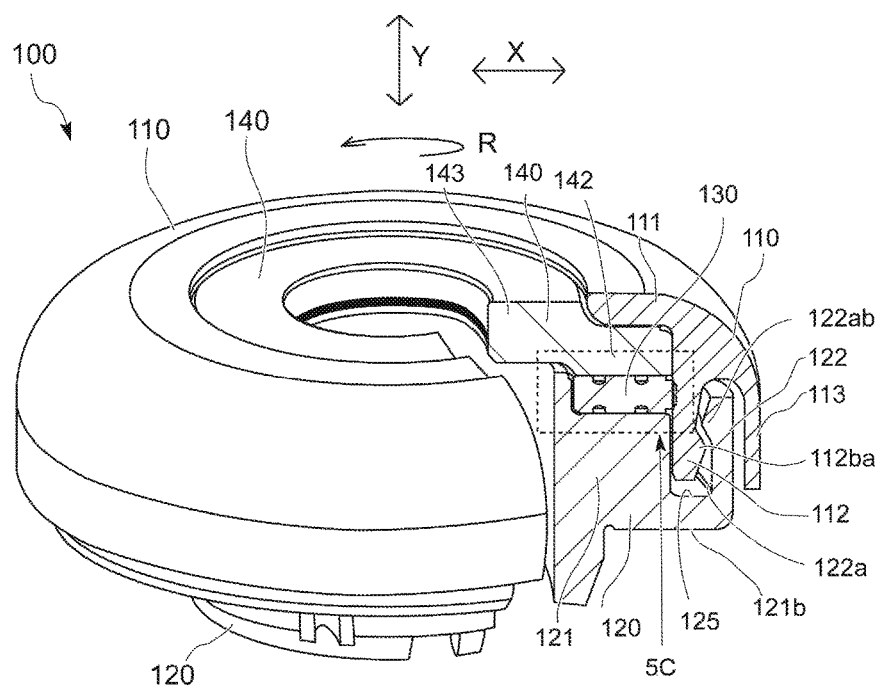
FIG. 1 is a partial cross-sectional perspective view of a thrust sliding bearing according to an embodiment of the present invention.
Figure 2:
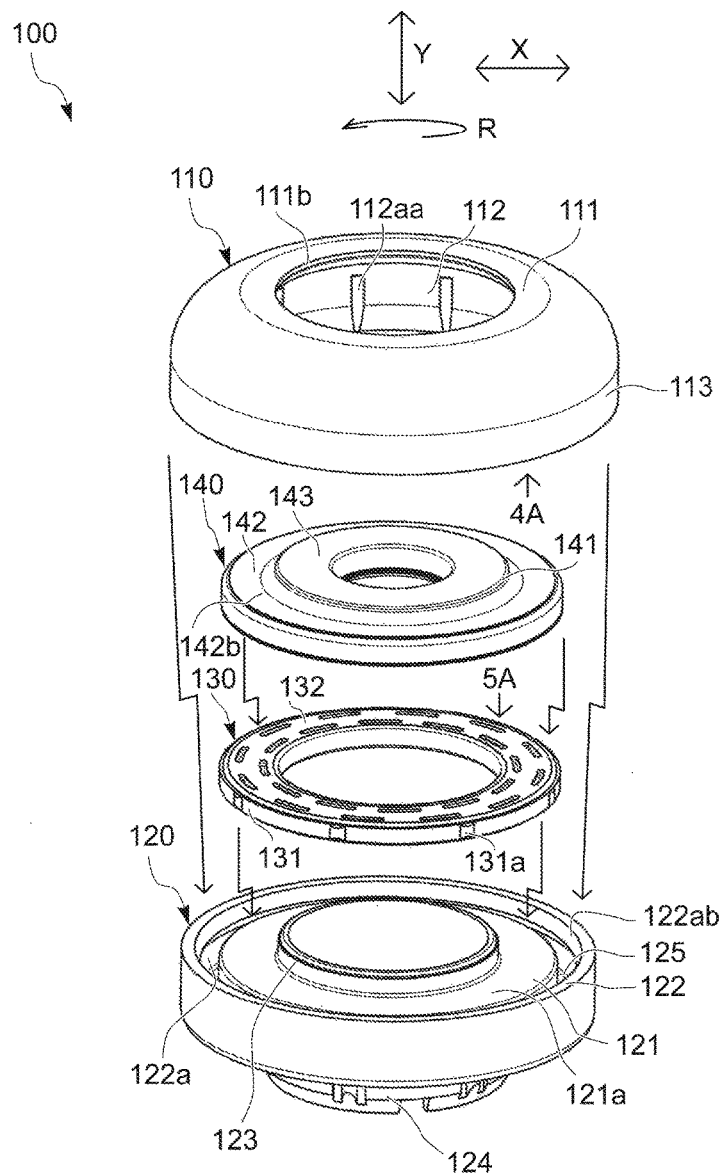
FIG. 2 is an exploded perspective view of the thrust sliding bearing according to the embodiment of the present invention.
Figure 4A:
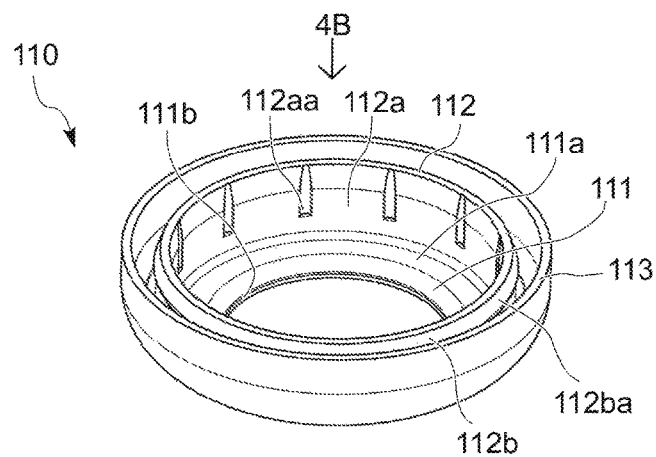
FIG. 4A is a perspective view as seen from the direction represented with reference numeral 4A in FIG. 2.
Figure 4B:
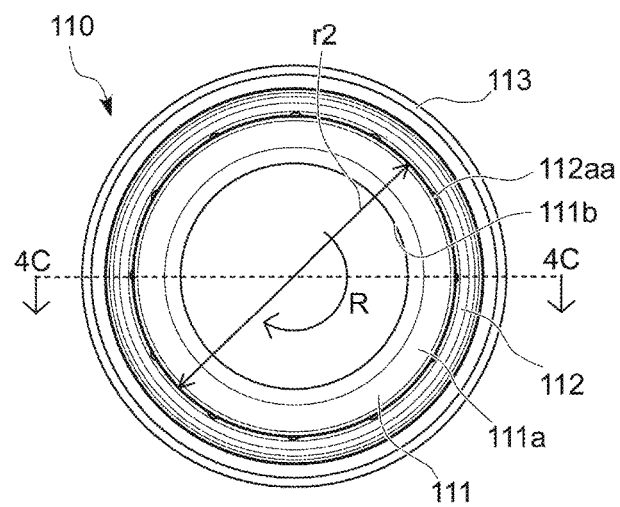
FIG. 4B is a bottom view as seen from the direction represented with reference numeral 4B in FIG. 4A.
Figure 4C:
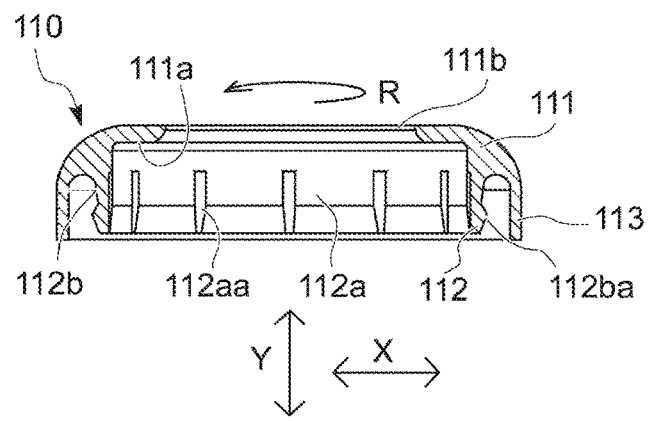
FIG. 4C is a cross-sectional view taken along the line 4C-4C in FIG. 4B.
Figure 5A:
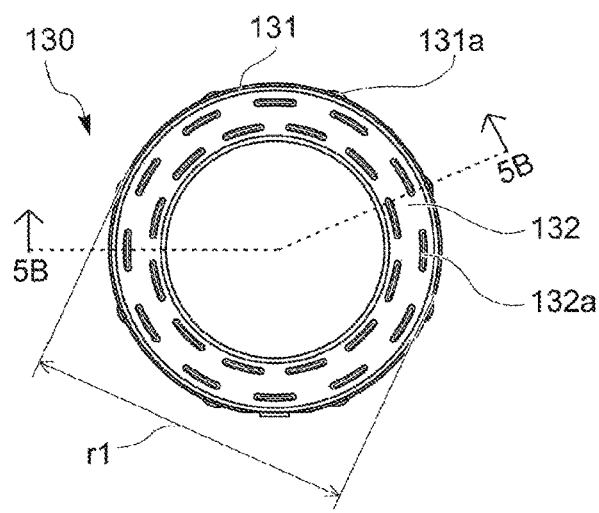
FIG. 5A is a plan view as seen from the direction represented with reference numeral 5A in FIG. 2.
Figure 5B:
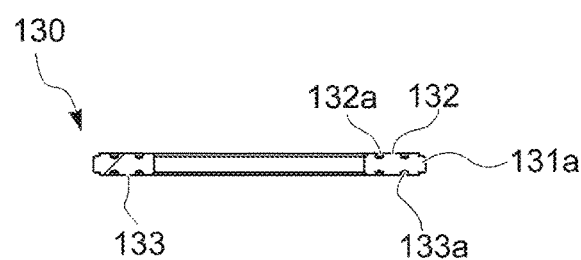
FIG. 5B is a cross-sectional view taken along the line 5B-5B in FIG. 5A.
Figure 5C:
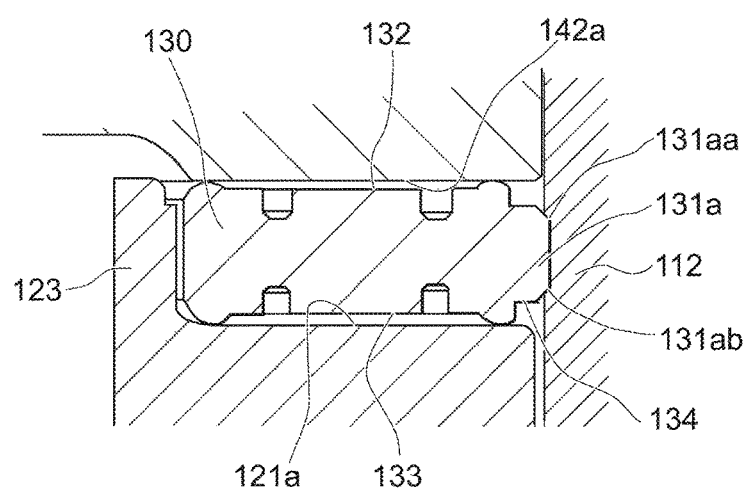
FIG. 5C is an enlarged cross-sectional view of the portion represented with reference numeral 5C in FIG. 1.
Figure 6:
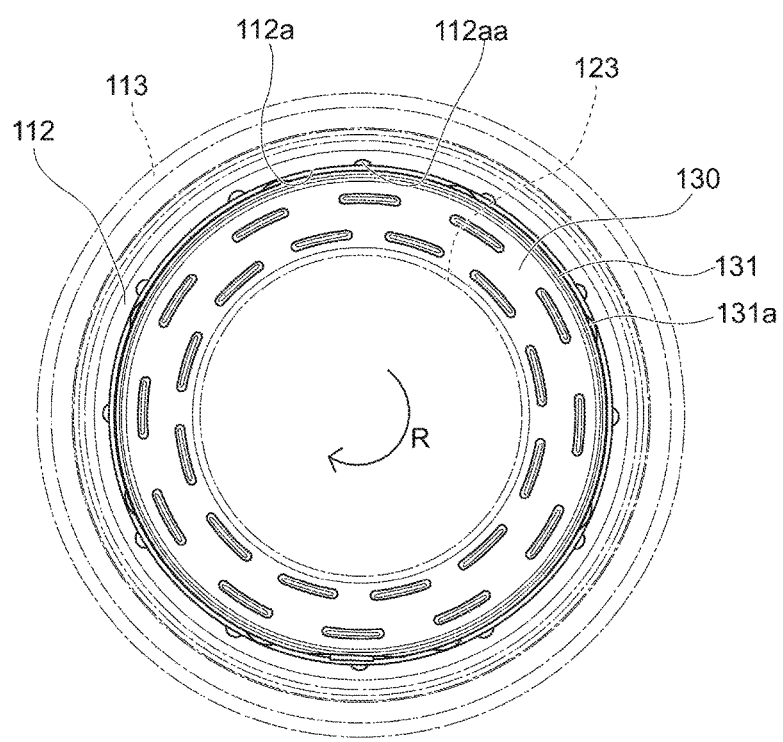
FIG. 6 is an internal perspective plan view illustrating a state where anti-rotation engaging convex portions of the present embodiment are not engaged with anti-rotation engaging grooves.
Figure 7:
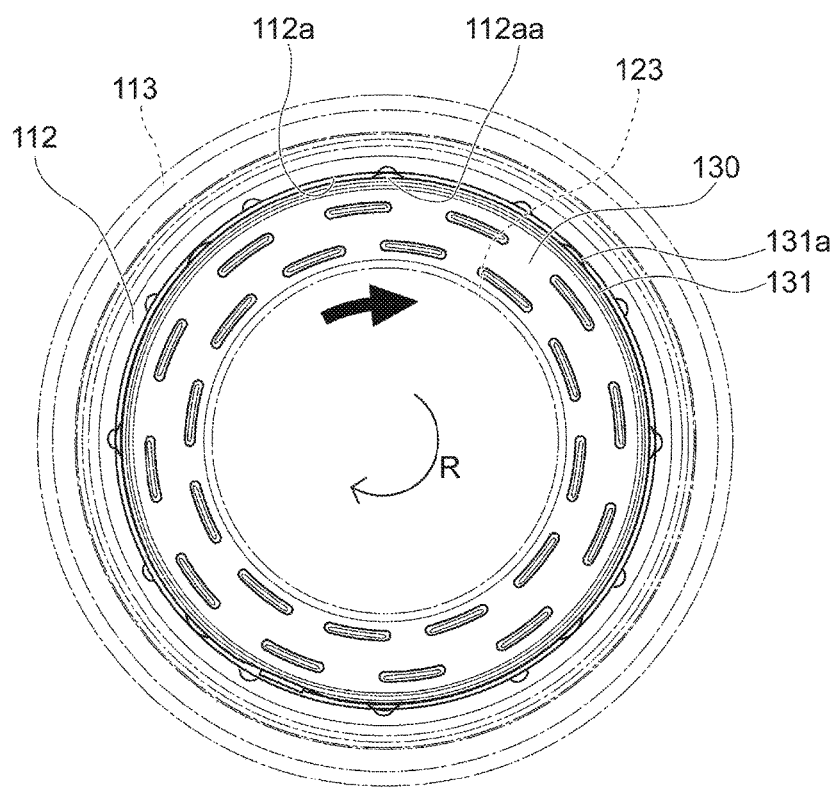
FIG. 7 is an internal perspective plan view illustrating a state where the anti-rotation engaging convex portions of the present embodiment are engaged with the anti-rotation engaging grooves.

Here, FIG. 1 is a partial cross-sectional perspective view of the thrust sliding bearing 100 of the embodiment of the present invention; FIG. 2 is an exploded perspective view of the thrust sliding bearing 100 of the embodiment of the present invention; FIG. 3 is a cross-sectional view illustrating a state where the thrust sliding bearing 100 of the present invention is incorporated into a strut-type suspension SS; FIG. 4A is a perspective view as seen from the direction represented with reference numeral 4A in FIG. 2; FIG. 4B is a bottom view as seen from the direction represented with reference numeral 4B in FIG. 4A; FIG. 4C is a cross-sectional view taken along the line 4C-4C in FIG. 4B; FIG. 5A is a plan view as seen from the direction represented with reference numeral 5A in FIG. 2; FIG. 5B is a cross-sectional view taken along the line 5B-5B in FIG. 5A; FIG. 5C is an enlarged cross-sectional view of the portion represented with reference numeral 5C in FIG. 1; FIG. 6 is an internal perspective plan view illustrating a state where anti-rotation engaging convex portions 131a of the present embodiment are not engaged with anti-rotation engaging grooves 112aa; and FIG. 7 is an internal perspective plan view illustrating a state where the anti-rotation engaging convex portions 131a of the present embodiment are engaged with the anti-rotation engaging grooves 112aa.

The thrust sliding bearing 100 of the embodiment of the present invention is, as shown in FIG. 1 to FIG. 7, provided with a synthetic resin-made annular upper case 110, a synthetic resin-made annular lower case 120, an annular synthetic resin-made sliding bearing piece 130, and an annular metal plate 140, the surface of which is processed, for example, by plating.

Among these components, the upper case 110 is configured to be attached to an upper end portion of a piston rod SS1 (see FIG. 3), which is used in a shock absorber of the strut-type suspension SS, with the piston rod SS1 inserted in the upper case 110.

In the present embodiment, as shown in FIG. 4A to FIG. 4C, the upper case 110 integrally includes an annular upper case base 111, an upper case inner cylindrical portion 112 as an upper case cylindrical portion, and an upper case outer cylindrical portion 113.

The upper case base 111 is provided with an annular bottom surface 111a contactable with the annular metal plate 140 and a metal plate engaging hole 111b formed radially inward from the annular bottom surface 111a.

The upper case inner cylindrical portion 112 provided to extend vertically from the annular bottom surface 111a of the upper case base 111 is configured so as to be fitted in the lower case 120.

Further, the upper case inner cylindrical portion 112 includes for example, the twelve anti-rotation engaging grooves 112aa provided to extend in an axial direction Y in an inner circumferential surface 112a facing the synthetic resin-made sliding bearing piece 130.

Furthermore, an annular engaging ridge 112ba is formed on an annular engaging outer circumferential surface 112b as an outer circumferential surface of the upper case inner cylindrical portion 112 so as to extend in a circumferential direction R.

The upper case outer cylindrical portion 113 is formed so as to cover an outer circumference of the lower case 120 from above.

The lower case 120 is configured so as to rotate relative to the upper case 110 about an axial center of the piston rod SS1 while being overlapped with the upper case 110.

In the present embodiment, the lower case 120 integrally includes an annular lower case base 121, an outer cylindrical projecting portion 122, an inner cylindrical projecting portion 123, and a lower cylindrical portion 124.

The lower case base 121 includes an annular top surface 121a which is formed so as to face the annular bottom surface 111a of the upper case 110 and an annular bottom surface 121b which is formed opposite from the annular top surface 121a to receive a load from a damper coil spring SS2 of the strut-type suspension SS.

The outer cylindrical projecting portion 122 is provided so as to project from an outer circumferential end of the annular bottom surface 121b of the lower case base 121 toward the upper case base 111.

Further, an annular engaging ridge 122ab is formed on an annular engaging inner circumferential surface 122a as an inner circumferential surface of the outer cylindrical projecting portion 122 so as to extend in the circumferential direction R.

The engaging ridge 122ab of the annular engaging inner circumferential surface 122a of the lower case 120 is engaged with the engaging ridge 112ba of the annular engaging outer circumferential surface 112b of the upper case 110, thereby allowing a relative rotation in the circumferential direction R between the upper case 110 and the lower case 120.

The inner cylindrical projecting portion 123 is provided so as to project from an inner circumferential end of the annular top surface 121a of the lower case base 121 toward the upper case base 111.

In addition, the inner cylindrical projecting portion 123 is configured so as to slidably contact an inner circumference of the synthetic resin-made sliding bearing piece 130.

The lower cylindrical portion 124 is provided so as to project downward from an inner circumferential end of the annular bottom surface 121b of the lower case base 121. The lower cylindrical portion 124 is configured so as to be inserted in an annular spacing member AT3 of an attachment mechanism AT.

Moreover, an annular groove 125 located radially outward from the annular top surface 121a of the lower case base 121 is formed by the annular top surface 121a of the lower case base 121, the lower case base 121, and the outer cylindrical projecting portion 122.

The synthetic resin-made sliding bearing piece 130 provided in an annular space formed between the upper case 110 and the lower case 120 is configured so as to receive a thrust load of the piston rod SS1.

Further, for example, the eight anti-rotation engaging convex portions 131a projecting radially outward are formed on an outer circumferential rim 131 of the synthetic resin-made sliding bearing piece 130. The anti-rotation engaging convex portions 131a are provided engageable with the anti-rotation engaging grooves 112aa of the upper case 110.

Circumferential grooves 132a extending in the circumferential direction R are arranged in plural rows in a top surface 132 of the synthetic resin-made sliding bearing piece 130, and circumferential grooves 133a extending in the circumferential direction R are arranged in plural rows in a bottom surface 133 of the synthetic resin-made sliding bearing piece 130. Each of the circumferential grooves 132a, 133a is an accumulating portion of lubricant oil such as grease.

The annular metal plate 140 firmly attached to the piston rod SS1 is interposed between the upper case 110 and the synthetic resin-made sliding bearing piece 130.

The annular metal plate 140 includes an annular stepped portion 141 via which this annular metal plate 140 is divided into a portion at the radially outward side and a portion at the radially inward side.

With this configuration, rigidity of the annular metal plate 140 is increased.

Further, a metal plate outward bottom surface 142a of the metal plate outward portion 142 located radially outward from the annular stepped portion 141 is provided in contact with the top surface 132 of the synthetic resin-made sliding bearing piece 130 so as to face the top surface 132.

Furthermore, a metal plate outward top surface 142b of the metal plate outward portion 142 is provided in contact with the annular bottom surface 111a of the upper case base 111.

Moreover, a metal plate inward portion 143 located radially inward from the annular stepped portion 141 is engaged with the metal plate engaging hole 111b of the upper case base 111.

With this configuration, the position of the annular metal plate 140 relative to the upper case 110 in a radial direction X is determined.

Here, as shown in FIG. 3, the thrust sliding bearing 100 of the present embodiment is incorporated as the thrust sliding bearing 100 of the strut-type (McPherson) suspension SS via the attachment mechanism AT into the four-wheeled vehicle.

The strut-type suspension SS includes the piston rod SS1, for example, the hydraulic shock absorber using the piston rod SS1, the damper coil spring SS2, an upper spring seating member SS3 which receives an upper end of the damper coil spring SS2, and a bump stopper SS4 which is provided so as to surround the piston rod SS1.

The attachment mechanism AT includes a resilient member AT2 in which a core metal AT1 is embedded and the annular spacing member AT3 interposed between the upper spring seating member SS3 and the annular bottom surface 121b of the lower case 120.

The thrust sliding bearing 100 is provided between the resilient member AT2 and the upper spring seating member SS3 in a state where the spacing member AT3 is interposed between the thrust sliding bearing 100 and the upper spring seating member SS3.

The resilient member AT2 is provided in contact with the upper case 110 while surrounding the thrust sliding bearing 100.

The piston rod SS1 includes a rod large-diameter portion SS1a which is inserted in the lower case 120, a rod small-diameter portion SS1b which is continuously formed with the rod large-diameter portion SS1a to have a diameter smaller than a diameter of the rod large-diameter portion SS1a and which is inserted in the annular metal plate 140, and a rod threaded portion SS1c which is continuously formed with the rod small-diameter portion SS1b.

The annular metal plate 140 is supported between a stepped portion located between the rod large-diameter portion SS1a and the rod small-diameter portion SS1b and a nut SS5 screwed to the rod threaded portion SS1c.

The rod large-diameter portion SS1a is provided in contact with the lower case 120 so as to rotate relative to the lower case 120 in the circumferential direction R.

Further, the resilient member AT2 is provided in contact with an outer circumference of the nut SS5.

Since the upper case 110 is held in the resilient member AT2, the upper case 110 does not rotate in the circumferential direction R.

Furthermore, the annular metal plate 140 is configured so as not to rotate in the circumferential direction R.

As described above, with a combined mechanism of the thrust sliding bearing 100 and the piston rod SS1, when the damper coil spring SS2 is rotated in the circumferential direction R by steering operation of the four-wheeled vehicle, the lower case 120 rotates relative to the upper case 110.

The lower case 120 is smoothly rotated by the synthetic resin-made sliding bearing piece 130 arranged between the lower case 120 and the upper case 110, and the steering operation is performed with little resistance.

Next, the feature of the thrust sliding bearing 100 of the present embodiment will be described in more detail.

In an incorporating process for incorporating the synthetic resin-made sliding bearing piece 130 into the inner side of the upper case inner cylindrical portion 112, when the synthetic resin-made sliding bearing piece 130 is simply incorporated into the inner side of the upper case inner cylindrical portion 112 to be pressed thereinto without consideration of a so-called phase, i.e. an angle of the synthetic resin-made sliding bearing piece 130 relative to the upper case 110, as shown in FIG. 6, all of the eight anti-rotation engaging convex portions 131a of the synthetic resin-made sliding bearing piece 130 often fail to be engaged with all of the twelve anti-rotation engaging grooves 112aa of the upper case 110.

Such not fully engaged state when the synthetic resin-made sliding bearing piece is incorporated into the upper case inner cylindrical portion will be described below.

In the present embodiment, as shown in FIG. 6, the synthetic resin-made sliding bearing piece 130 is pressed into the inner side of the upper case inner cylindrical portion 112 with the plural anti-rotation engaging convex portions 131a that are projected radially outward from the outer circumferential rim 131 of the synthetic resin-made sliding bearing piece 130 to be engageable with the anti-rotation engaging grooves 112aa of the upper case 110.

With this configuration, a friction force is generated between the outer circumferential rim 131 and the anti-rotation engaging convex portions 131a of the synthetic resin-made sliding bearing piece 130 and an inner circumference of the upper case inner cylindrical portion 112; thereby, the friction force between the synthetic resin-made sliding bearing piece 130 and the upper case 110 becomes larger than a friction force between the synthetic resin-made sliding bearing piece 130 and the lower case 120. As a result, a holding force by which the synthetic resin-made sliding bearing piece 130 is held toward the upper case 110 acts.

Also, as shown in FIG. 7, even if the synthetic resin-made sliding bearing piece 130 is rotated relative to the upper case 110 by the steering operation of the four-wheeled vehicle, the anti-rotation engaging convex portions 131a are brought into engagement with the anti-rotation engaging grooves 112aa. Accordingly, the rotation of the synthetic resin-made sliding bearing piece 130 relative to the upper case 110 is regulated within an angle smaller than 360 degrees. Therefore, the synthetic resin-made sliding bearing piece 130 is held.

Furthermore, the surface plating of the annular metal plate 140 is retained and thus an antirust effect is maintained.

Also, in the present embodiment, an imaginary maximum outer diameter r1 of the synthetic resin-made sliding bearing piece 130 including the anti-rotation engaging convex portions 131a shown in FIG. 5A is larger than an imaginary maximum inner diameter r2 of the inner circumferential surface 112a of the upper case inner cylindrical portion 112 shown in FIG. 4B, not including the anti-rotation engaging grooves 112aa.

With this configuration, the synthetic resin-made sliding bearing piece 130 is brought into a state of being pressed into the inner side of the upper case inner cylindrical portion 112.

Further, in the present embodiment, as shown in FIG. 4B, for example, the twelve anti-rotation engaging grooves 112aa are arranged at equal intervals in the circumferential direction R of the piston rod SS1.

Furthermore, as shown in FIG. 5A, for example, the eight anti-rotation engaging convex portions 131a are arranged at equal intervals in the circumferential direction R.

In addition, a relation between the twelve anti-rotation engaging grooves 112aa and the eight anti-rotation engaging convex portions 131a is defined so that the common divisor therebetween is 4.

Therefore, as shown in FIG. 6 and FIG. 7, a part of the plural anti-rotation engaging convex portions 131a are brought into engagement with a part of the anti-rotation engaging grooves 112aa until the synthetic resin-made sliding bearing piece 130 is rotated relative to the upper case 110 by 15 degrees, i.e. 15 as a value of the greatest common divisor between an angle of 30 degrees with which the anti-rotation engaging grooves 112aa are arranged at equal intervals and an angle of 45 degrees with which the anti-rotation engaging convex portions 131a are arranged at equal intervals.

In other words, the synthetic resin-made sliding bearing piece 130 requires only a small rotation angle relative to the upper case 110.

Also, in the present embodiment, the greatest common divisor between the twelve anti-rotation engaging grooves 112aa and the eight anti-rotation engaging convex portions 131a is defined as 4, which is defined as 3 or greater.

Therefore, there are provided three or more engagement portions between the anti-rotation engaging grooves 112aa and the anti-rotation engaging convex portions 131a.

In other words, the center of the upper case 110 becomes precisely coaxial with the center of the synthetic resin-made sliding bearing piece 130.

Furthermore, as shown in FIG. 1, the upper case inner cylindrical portion 112 is inserted in the annular groove 125 of the lower case 120.

In addition, the engaging ridge 122ab of the outer cylindrical projecting portion 122 of the lower case 120 is engaged with the engaging ridge 112ba of the upper case inner cylindrical portion 112.

Moreover, as shown in FIG. 5C, an outer circumferential rim stepped portion 134 is formed in the bottom surface 133 of the synthetic resin-made sliding bearing piece 130 so as to extend along the outer circumferential rim 131 on the bottom surface 133 and to be recessed upward in the axial direction. The outer circumferential rim stepped portion 134 is provided to face an outer circumferential rim on the annular top surface 121a of the lower case base 121.

In other words, the synthetic resin-made sliding bearing piece 130 is not in contact with the outer circumferential rim on the annular top surface 121a of the lower case base 121.

With this configuration, even if the synthetic resin-made sliding bearing piece 130 is deformed by an excess load, the deformed portion of the synthetic resin-made sliding bearing piece 130 does not insert into a clearance between the outer circumferential rim on the annular top surface 121a of the lower case base 121 and the inner circumferential surface 112a of the upper case inner cylindrical portion 112.

In other words, the relative rotation between the upper case 110 and the lower case 120 is prevented from being hindered by the generation of a so-called wedge effect.

Also, in the present embodiment, each anti-rotation engaging convex portion 131a includes an upper tapered surface 131aa as a tapered surface which is arranged at the upper side in the axial direction Y so as to be inclined with respect thereto.

Likewise, each anti-rotation engaging convex portion 131a includes a lower tapered surface 13 lab as a tapered surface which is arranged at the lower side in the axial direction Y so as to be inclined with respect thereto.

With this configuration, in the incorporating process for incorporating the synthetic resin-made sliding bearing piece 130 into the inner side of the upper case inner cylindrical portion 112, the upper tapered surface 131aa is brought into contact with the upper case inner cylindrical portion 112, thereby guiding the synthetic resin-made sliding bearing piece 130.

Also, in incorporating the synthetic resin-made sliding bearing piece 130 with the top surface and the bottom surface reversely oriented, the lower tapered surface 131ab is brought into contact with the upper case inner cylindrical portion 112, thereby guiding the synthetic resin-made sliding bearing piece 130. As a result, the consideration of the top surface 132 and the bottom surface 133 of the synthetic resin-made sliding bearing piece 130 is not necessary.

In other words, it is not necessary to consider the top or bottom of the synthetic resin-made sliding bearing piece 130.

According to the thrust sliding bearing 100 of the embodiment of the present invention obtained as described above, the upper case 110 is integrally configured at least by the annular upper case base 111 having the annular bottom surface 111a and by the upper case inner cylindrical portion 112 as the upper case cylindrical portion provided to extend vertically from the annular bottom surface 111a of the upper case base 111 to be fitted in the lower case 120. The upper case inner cylindrical portion 112 of the upper case 110 includes the anti-rotation engaging grooves 112aa that is provided to extend in the axial direction Y in the inner circumferential surface 112a facing the synthetic resin-made sliding bearing piece 130, and in addition, the synthetic resin-made sliding bearing piece 130 is fixed to the inner side of the upper case inner cylindrical portion 112 of the upper case 110, with the plural anti-rotation engaging convex portions 131a that projects radially outward from the outer circumferential rim 131 of the synthetic resin-made sliding bearing piece 130 to be engagable with the anti-rotation engaging grooves 112aa of the upper case 110. With the configuration just described, sliding between the synthetic resin-made sliding bearing piece 130 and the annular metal plate 140 is inhibited and thus cracking of the surface plating of the annular metal plate 140 is avoided, and, for example, not only unusual wear of the synthetic resin-made sliding bearing piece 130, which is caused by abrasion powder of the surface plating, but also discoloration of grease, which is caused by abrasion powder of the surface plating, can be avoided. Even if the synthetic resin-made sliding bearing piece 130 is rotated relative to the upper case 110, subsequent sliding between the synthetic resin-made sliding bearing piece 130 and the annular metal plate 140 can be prevented. Also, under severe service conditions for temperature, impacts, dust, humidity, dirt, or the like when the bearing piece is used in a suspension for an automobile, the rigidity of the annular metal plate 140 is maintained and thus the automobile can be supported.

Also, the imaginary maximum outer diameter r1 of the synthetic resin-made sliding bearing piece 130 including the anti-rotation engaging convex portions 131a is larger than the imaginary maximum inner diameter r2 of the inner circumferential surface 112a of the upper case inner cylindrical portion 112 of the upper case 110, not including the anti-rotation engaging grooves 112aa. Therefore, a friction force can be easily generated between the outer circumferential rim 131 and the anti-rotation engaging convex portions 131a of the synthetic resin-made sliding bearing piece 130 and the inner circumference of the upper case inner cylindrical portion 112 of the upper case 110.

Furthermore, for example, the twelve anti-rotation engaging grooves 112aa are arranged at equal intervals in the circumferential direction R of the piston rod SS1. For example, the eight anti-rotation engaging convex portions 131a are arranged at equal intervals in the circumferential direction R. The relation between the twelve anti-rotation engaging grooves 112aa and the eight anti-rotation engaging convex portions 131a is defined so that the common divisor therebetween is 4. Therefore, the rotation angle of the synthetic resin-made sliding bearing piece 130 relative to the upper case 110 can be reduced.

Also, the greatest common divisor between the twelve anti-rotation engaging grooves 112aa and the eight anti-rotation engaging convex portions 131a is defined as 4, which is defined as 3 or greater. Therefore, the center of the synthetic resin-made sliding bearing piece 130 is aligned with the center of the upper case 110 and thus eccentricity therebetween can be avoided.

Furthermore, the lower case 120 is integrally configured at least by the annular lower case base 121 having the annular top surface 121a that faces the annular bottom surface 111a of the upper case 110 and by the outer cylindrical projecting portion 122 projecting from the outer circumferential end of the annular bottom surface 121b of the lower case base 121 toward the upper case base 111. The annular groove 125 located radially outward from the annular top surface 121a of the lower case base 121 is formed by the annular top surface 121a of the lower case base 121, the lower case base 121, and the outer cylindrical projecting portion 122. The upper case inner cylindrical portion 112 of the upper case 110 is inserted in the annular groove 125 of the lower case 120, and the annular engaging ridge 122ab formed to extend in the circumferential direction R on the annular engaging inner circumferential surface 122a as the inner circumferential surface of the outer cylindrical projecting portion 122 of the lower case 120 is engaged with the annular engaging ridge 112ba formed to extend in the circumferential direction R on the annular engaging outer circumferential surface 112b as the outer circumferential surface of the upper case inner cylindrical portion 112 of the upper case 110. The outer circumferential rim stepped portion 134 is formed in the bottom surface 133 of the synthetic resin-made sliding bearing piece 130 so as to extend along the outer circumferential rim 131 on the bottom surface 133 and to be recessed upward in the axial direction, and the outer circumferential rim stepped portion 134 faces the outer circumferential rim of the annular top surface 121a of the lower case base 121. Even if the synthetic resin-made sliding bearing piece 130 is deformed by an excess load, the deformed portion of the synthetic resin-made sliding bearing piece 130 is inserted into a clearance between the outer circumferential rim on the annular top surface 121a of the lower case base 121 and the inner circumferential surface 112a of the upper case inner cylindrical portion 112 of the upper case 110 and thus a so-called wedge effect may be generated. Even in such case, with the configuration described above, the relative rotation between the upper case 110 and the lower case 120 can be prevented from being hindered by the wedge effect.

Also, the annular metal plate 140 includes the annular stepped portion 141 via which the annular metal plate 140 is divided into a portion at the radially outward side and a portion at the radially inward side. The metal plate outward bottom surface 142a of the metal plate outward portion 142 located radially outward from the annular stepped portion 141 is provided in contact with the top surface 132 of the synthetic resin-made sliding bearing piece 130 so as to face the top surface 132. The metal plate inward portion 143 located radially inward from the annular stepped portion 141 is engaged with the metal plate engaging hole 111b formed in the upper case 110. With the configuration just described, the annular metal plate 140 surely receives a thrust load from the synthetic resin-made sliding bearing piece 130; therefore, the position of the thrust sliding bearing 100 relative to the piston rod SS1 in the radial direction X is precisely determined. As a result, the annular metal plate 140 can surely receive a load from the piston rod SS1.

Furthermore, the anti-rotation engaging convex portion 131a includes the tapered surfaces arranged respectively at the upper and lower sides in the axial direction Y so as to be inclined with respect thereto. In the incorporating process for incorporating the synthetic resin-made sliding bearing piece 130 into the inner side of the upper case inner cylindrical portion 112 of the upper case 110, the synthetic resin-made sliding bearing piece 130 can be smoothly pressed into the inner side of the upper case inner cylindrical portion 112 of the upper case 110, and the effect thereof is great, for example, a wrong assembly such as the assembly of the synthetic resin-made sliding bearing piece 130 in a wrong direction can be avoided.

EXPLANATION OF REFERENCE NUMERALS 100 thrust sliding bearing
110 upper case
111 upper case base
111a annular bottom surface
111b metal plate engaging hole
112 upper case inner cylindrical portion (upper case cylindrical portion)
112a inner circumferential surface
112aa anti-rotation engaging groove
112b annular engaging outer circumferential surface (outer circumferential surface)
112ba engaging ridge
113 upper case outer cylindrical portion
120 lower case
121 lower case base
121a annular top surface
121b annular bottom surface
122 outer cylindrical projecting portion
122a annular engaging inner circumferential surface (inner circumferential surface)
122ab engaging ridge
123 inner cylindrical projecting portion
124 lower cylindrical portion
125 annular groove
130 synthetic resin-made sliding bearing piece
131 outer circumferential rim
131a anti-rotation engaging convex portion
131aa upper tapered surface
131ab lower tapered surface
132 top surface
132a circumferential groove 133 bottom surface
133a circumferential groove
134 outer circumferential rim stepped portion
140 annular metal plate
141 annular stepped portion
142 metal plate outward portion
142a metal plate outward bottom surface
142b metal plate outward top surface
143 metal plate inward portion
AT attachment mechanism
AT1 core metal
AT2 resilient member
AT3 spacing member
R circumferential direction
r1 imaginary maximum outer diameter of synthetic resin-made sliding bearing piece including anti-rotation engaging convex portion
r2 imaginary maximum inner diameter of inner circumferential surface of upper case cylindrical portion, not including anti-rotation engaging groove,
SS strut-type suspension
SS1 piston rod
SS1a rod large-diameter portion
SS1b rod small-diameter portion
SS1c rod threaded portion
SS2 damper coil spring
SS3 upper spring seating member
SS4 bump stopper
SS5 nut
X radial direction
Y axial direction

The invention claimed is:

1. A thrust sliding bearing comprising:
an annular upper case, into which an upper end portion of a piston rod is inserted is inserted, the piston rod being used in a shock absorber of a strut-type suspension;
an annular lower case overlapped with the upper case to be rotatable relative to the upper case about an axial center of the piston rod;
an annular synthetic resin-made sliding bearing piece provided in an annular space formed between the upper case and the lower case for receiving a thrust load of the piston rod; and
an annular metal plate attached to the piston rod and interposed between the upper case and the synthetic resin-made sliding bearing piece,
wherein the upper case is integrally configured by an annular upper case base, which has an annular bottom surface, and by an upper case cylindrical portion, which is provided to extend vertically from the annular bottom surface of the upper case base to be fitted in the lower case, and
wherein the synthetic resin-made sliding bearing piece is fixed to an inner side of the upper case cylindrical portion of the upper case.

2. The thrust sliding bearing according to claim 1, wherein the synthetic resin-made sliding bearing piece includes at least one anti-rotation engaging convex portion projecting radially outward from an outer circumferential rim of the synthetic resin-made sliding bearing piece, and
the synthetic resin-made sliding bearing piece is pressed into the inner side of the upper case cylindrical portion of the upper case.

3. The thrust sliding bearing according to claim 2, wherein the upper case cylindrical portion includes an anti-rotation engaging groove, which is provided to extend in an axial direction in the inner circumferential surface facing the synthetic resin-made sliding bearing piece, and
wherein the anti-rotation engaging convex portion of the synthetic resin-made sliding bearing piece is engageable with the anti-rotation engaging groove.

4. The thrust sliding bearing according to claim 3, wherein a maximum outer diameter of the synthetic resin-made sliding bearing piece including the anti-rotation engaging convex portion of the synthetic resin-made sliding bearing piece is larger than a maximum inner diameter of the inner circumferential surface of the upper case cylindrical portion of the upper case, not including the anti-rotation engaging groove.

5. The thrust sliding bearing according to claim 3, wherein the anti-rotation engaging groove includes a plurality of anti-rotation engaging grooves, which are arranged at equal intervals in a circumferential direction of the piston rod,
wherein the anti-rotation engaging convex portion of the synthetic resin-made sliding bearing piece includes a plurality of anti-rotation engaging convex portions, which are arranged at equal intervals in the circumferential direction, and
wherein a relation between the number of anti-rotation engaging grooves and the number of anti-rotation engaging convex portions of the synthetic resin-made sliding bearing piece is defined to have a common divisor.

6. The thrust sliding bearing according to claim 5, wherein a greatest common divisor between the number of anti-rotation engaging grooves and the number of anti-rotation engaging convex portions of the synthetic resin-made sliding bearing piece is defined as 3 or greater.

7. The thrust sliding bearing according to claim 2, wherein the lower case is integrally configured at least by an annular lower case base, which has an annular top surface facing the annular bottom surface of the upper case, and by an outer cylindrical projecting portion, which projects from an outer circumferential end of an annular bottom surface of the lower case base toward the upper case base,
wherein an annular groove located radially outward from the annular top surface of the lower case base is formed by the annular top surface of the lower case base, the lower case base, and the outer cylindrical projecting portion,
wherein the upper case cylindrical portion of the upper case is inserted in the annular groove of the lower case, and an annular engaging ridge circumferentially formed on an inner circumferential surface of the outer cylindrical projecting portion of the lower case is engaged with an annular engaging ridge circumferentially formed on an outer circumferential surface of the upper case cylindrical portion, and
wherein an outer circumferential rim stepped portion is formed in a bottom surface of the synthetic resin-made sliding bearing piece to extend along the outer circumferential rim on the bottom surface and to be recessed upward in an axial direction, the outer circumferential rim stepped portion facing an outer circumferential rim on the annular top surface of the lower case base.

8. The thrust sliding bearing according to claim 2, wherein the annular metal plate includes an annular stepped portion, via which the annular metal-plate is divided into a metal plate outward portion, which is on a radially outer side of the annular stepped portion, and a metal plate inward portion, which is on a radially inner side of the annular stepped portion, a metal plate bottom surface, which is located on the metal plate outward portion, is in contact with a top surface of the synthetic resin-made sliding bearing piece, and the metal plate inward portion is engaged with a metal plate engaging hole formed in the upper case.

9. The thrust sliding bearing according to claim 2, wherein the anti-rotation engaging convex portion of the synthetic resin-made sliding bearing piece includes tapered surfaces arranged respectively at upper and lower sides of the anti-rotation engaging convex portion in the axial direction so as to be inclined with respect to the axial direction.

* * * * *